US006276723B1

(12) United States Patent
Willard

(10) Patent No.: US 6,276,723 B1
(45) Date of Patent: *Aug. 21, 2001

(54) TRAVEL BROCHURE HAVING CORRESPONDING MAP AND FLIP-UP BROCHURES

(76) Inventor: Marlene Willard, 955 Hephzibah Mcbean Rd., Hephzibah, GA (US) 30815

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/280,211

(22) Filed: Mar. 29, 1999

(51) Int. Cl.[7] .............................. B42D 1/00; B42D 15/00; G09B 29/04
(52) U.S. Cl. .............................. 283/34; 283/23; 283/24; 283/25; 283/26; 283/27; 283/28; 283/29; 283/30; 283/31; 283/32; 283/33; 283/35; 283/61; 283/62
(58) Field of Search .................. 283/34, 35, 23–33, 283/62, 61

(56) References Cited

U.S. PATENT DOCUMENTS

| 2,494,536 | * | 1/1950 | Atwood | 235/89 |
|---|---|---|---|---|
| 4,167,241 | | 9/1979 | Zumbrunn | 229/928 |
| 4,270,773 | * | 6/1981 | Gaetano | 283/34 |
| 4,289,333 | | 9/1981 | Gaetano | 283/35 |
| 4,348,038 | | 9/1982 | Lynch | 283/34 |
| 4,492,390 | | 1/1985 | Jacobs et al. | 281/31 |
| 4,534,581 | | 8/1985 | Engh | 281/15 |
| 4,685,699 | | 8/1987 | Hirasawa | 281/15 |
| 4,801,157 | | 1/1989 | Sink | 283/35 |
| 5,029,902 | * | 7/1991 | Komori | 283/56 |
| 5,170,917 | | 12/1992 | Tourigny | 224/221 |
| 5,445,524 | * | 8/1995 | Jones | 434/153 |
| 5,868,429 | * | 2/1999 | Raymond et al. | 283/34 |
| 5,890,741 | * | 4/1999 | Hollander | 283/62 |

* cited by examiner

Primary Examiner—A. L. Wellington
Assistant Examiner—Mark T. Henderson
(74) Attorney, Agent, or Firm—Allen, Dyer, Doppelt, Milbrath & Gilchrist, P.A.

(57) ABSTRACT

A travel brochure includes a sheet having at least three vertical fold line portions defining respective first and second left panels and first and second right panels. Each defines an upper edge. A map corresponds to a selected geographic area and is positioned on the first and second left panels on one side thereof. The map has color coated portions corresponding to designated roads. A set of flip-up brochures are positioned on each first and second right panel on the same side of the sheet as the map. Each set of flip-up brochures includes an upper edge that is secured along an upper edge of the respective first and second right panels. At least one set of flip-up brochures includes printed indicia corresponding to an address of a geographic attraction. The printed indicia is color coated to the color coating of the map.

18 Claims, 5 Drawing Sheets

TRAVEL BROCHURE HAVING CORRESPONDING MAP AND FLIP-UP BROCHURES

FIELD OF THE INVENTION

This invention is related to travel brochures, and more particularly, this invention is related to a travel brochure having a map corresponding to a selected geographic area and geographic attractions.

BACKGROUND OF THE INVENTION

Tourism has increased each year. With the rise of tourism throughout many cities of the United States and the world, different types of maps, tourist guides and travel brochures have been designed. Many of the maps and travel brochures are formed from laminated plastic sheets that are folded over each other. Other travel brochures are formed from flip out pages that are contained within folders produced from cardboard or plastic. Some of the maps and travel brochures are color coated, but they are not readily understandable and do not include a layout that allows easy correspondence between geographic attractions and the printed indicia, such as colored roads.

SUMMARY OF THE INVENTION

It is therefore an object of the present invention to provide a travel brochure that can be folded and includes a map corresponding to a selected geographic area having correspondence between the geographic attraction and the map.

It is still another object of the present invention to provide a travel brochure that facilitates correspondence between a geographic attraction and a map.

In accordance with the present invention, a travel brochure includes a sheet having at least three vertical fold line portions defining respective first and second left panels and first and second right panels. Each panel defines an upper edge. A map corresponding to a selected geographic area is positioned on the first and second left panels on one side thereof. Each map has color coated portions corresponding to designated roads. A set of flip-up brochures are positioned on each first and second right panel on the same side of the sheet as the map. Each set of flip-up brochures includes an upper edge that is secured along an upper edge of the respective first and second right panels. At least one set of flip-up brochures includes printed indicia corresponding to an address of a geographic attraction. The printed indicia is color coated to the color coating of the map.

In still another aspect of the present invention, the printed indicia corresponds to an address of a geographic attraction that is color coated to a color coated portion defining a street on the map positioned on first and second left panels. The flip-up brochures include a plurality of flip-up brochures connected at an upper edge. Each brochure comprises a map corresponding to a selected part of the map positioned on the first and second left panels. The vertical fold line portions include left fold line and respective first and second pairs of right fold lines defining vertical gutter margins to enhance folding. The side of the sheet opposing the map and flip-up brochures includes defined regions for photographs and printed indicia. At least one set of the flip-up brochures comprise staggered pages to enhance lifting of selected pages. Each staggered page includes a lower portion that is exposed by the immediately overlapping page. Each lower portion is exposed and includes printed indicia that identifies a particular type of attraction within the geographic area defined by the map on the first and second left panels.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The travel brochure of the present invention is advantageous because it now allows an advantageous layout of flip-up brochures and also a map corresponding to a selected geographic area. It also allows the map to have color coated portions corresponding to designated roads. The flip-up brochures can include printed indicia corresponding to an address of a geographic attraction, wherein the printed indicia is color coated to the color coating of the map.

Figure 1:
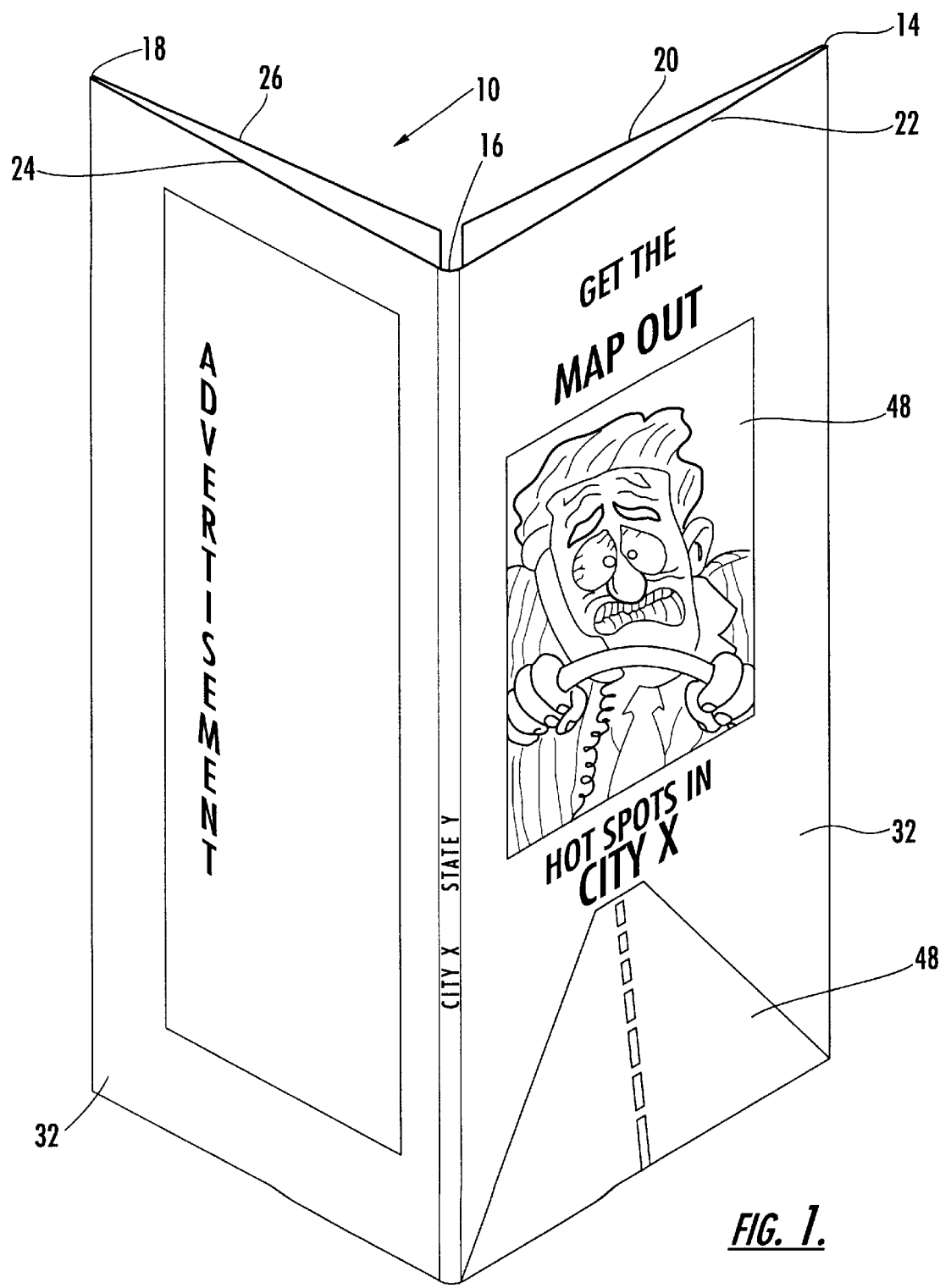
FIG. 1 is an isometric view of the travel brochure of the present invention showing the travel brochure partially folded.

FIG. 1 illustrates a perspective view of the travel brochure 10 of the present invention looking from the outside when it is partially folded. As illustrated, the travel brochure 10 is formed from a sheet 12 having at least three vertical fold line portions 14, 16, 18 that define respective first and second left panels 20, 22 and first and second right panels 24, 26, each defining an upper edge 28. The sheet 12 is substantially rectangular configured and the three vertical fold line portions 14, 16, 18 define four substantially rectangular configured panels 20, 22, 24, 26. The sheet 12 can be formed from thick paper, cardboard, plastic or paper that is laminated with plastic, and any other type of material that is known to those skilled in the art.

Figure 4:
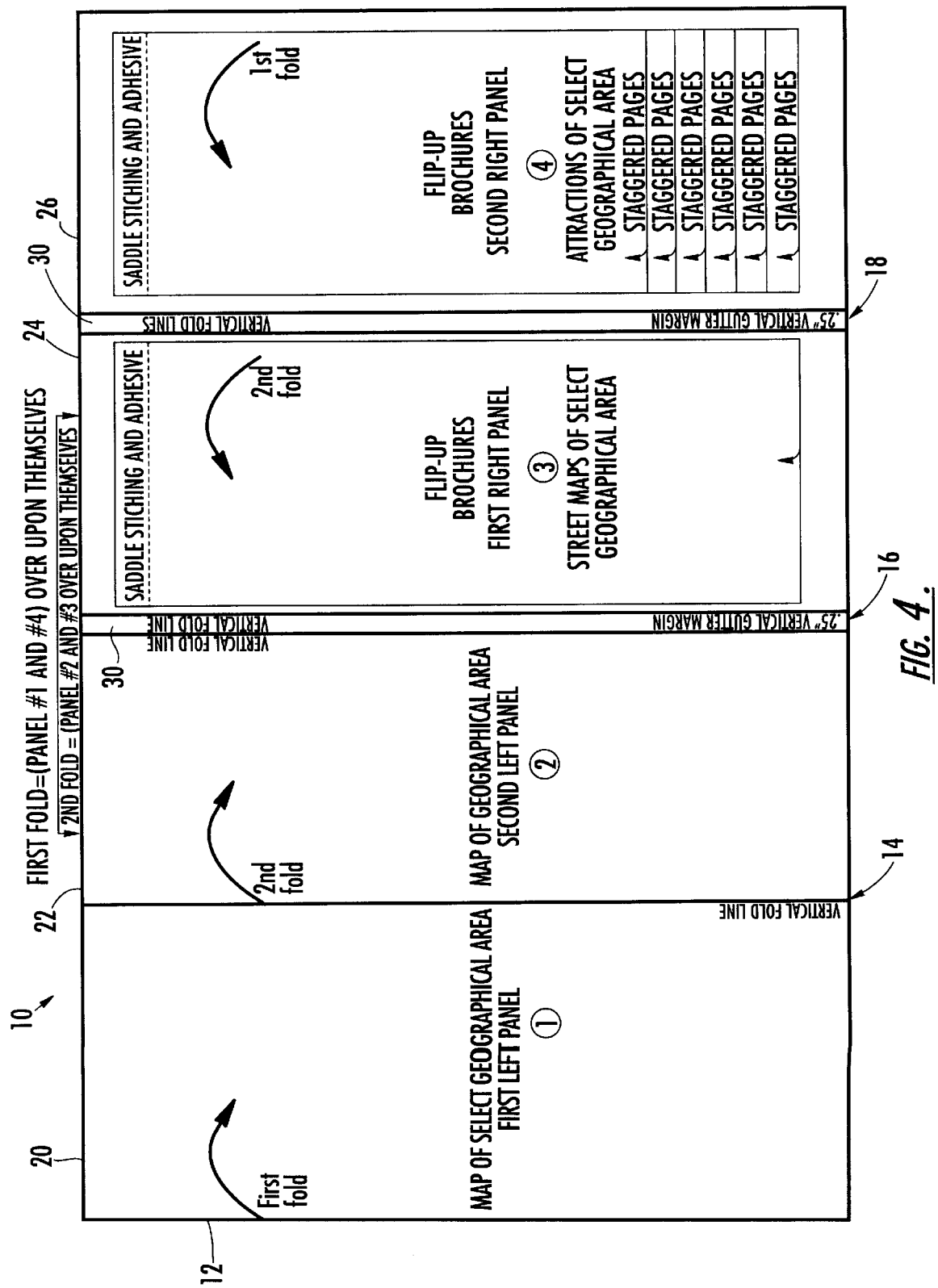
FIG. 4 is a schematic top plan view of the travel brochure looking at the inside cover and the flip-up brochures.
Figure 5:
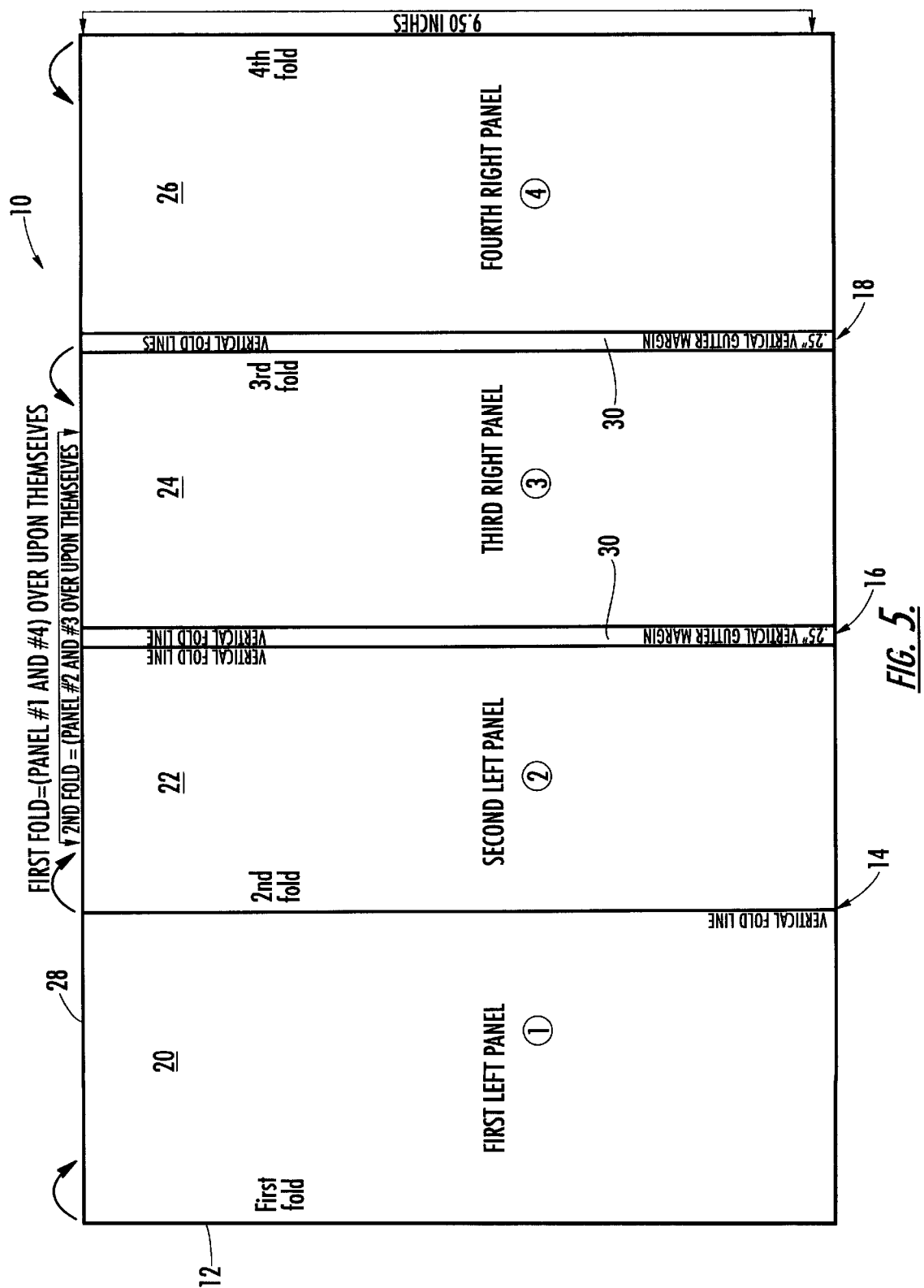
FIG. 5 is a top plan view of the travel brochure looking at the outside cover.

The vertical fold line portions 14, 16, 20 include a left fold line 14 and respective first and second pairs of right fold lines 16a, 16b, 18a, 18b defining vertical gutter margins 30 to enhance folding as shown in the inside cover of FIG. 4.

Figure 2:
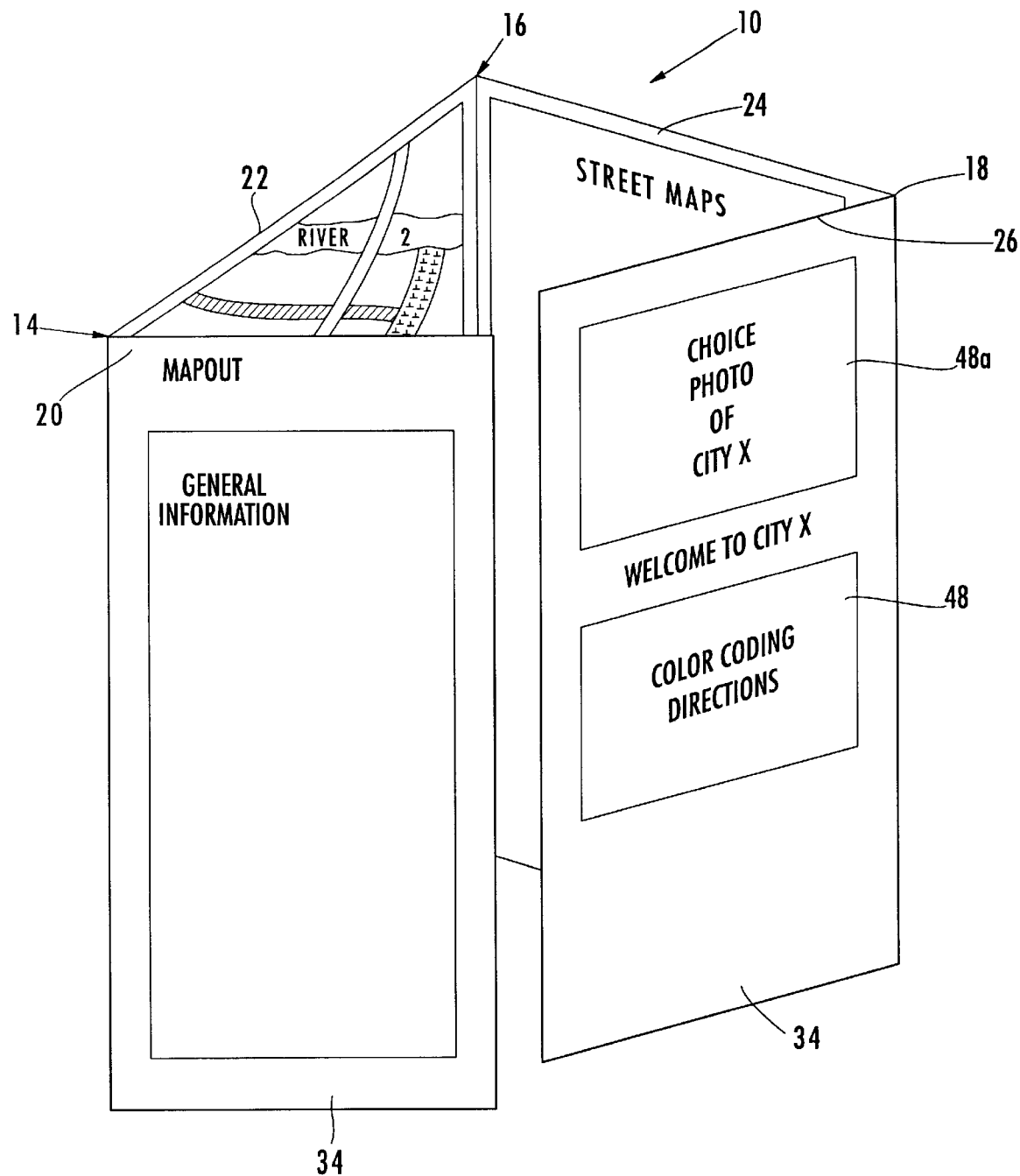
FIG. 2 is another perspective view of the travel brochure, partially unfolded, looking in the direction opposite to that of FIG. 1.

The outside cover 32 shown in FIG. 1 can include identifying indicia such as MAPOUT™ and other information, such as advertisements or printed matter. FIG. 2 shows the two sides 34 that are folded inward and include defined regions for photographs and printed indicia.

Figure 3:
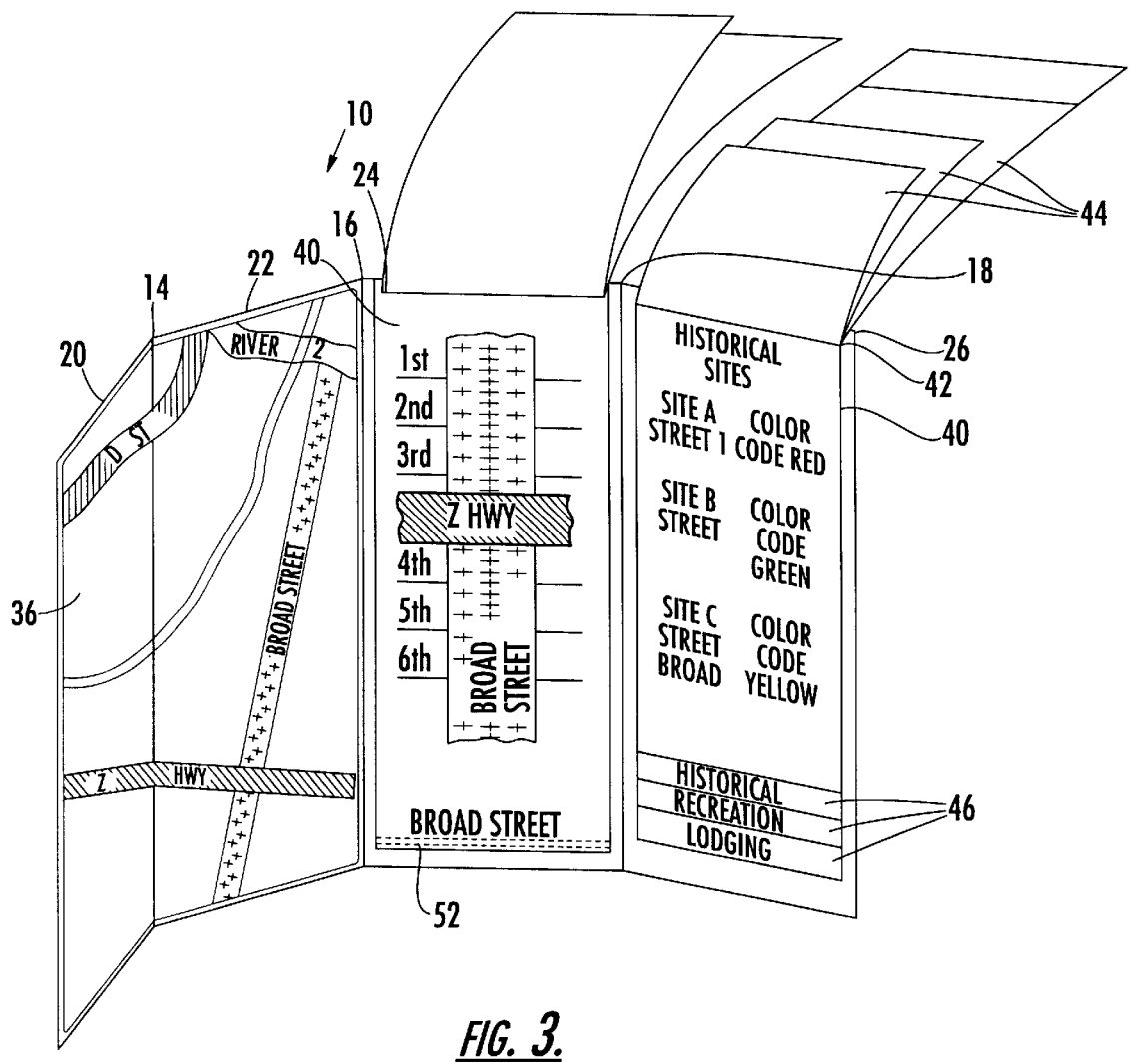
FIG. 3 is another perspective view of the travel brochure that is unfolded and shows each set of flip-up brochures having individual flip-up brochures that are lifted to show a map and historical sites corresponding to geographic attractions.

As shown in FIGS. 3 and 4, a map 36 corresponding to a selected geographic area is positioned on the first and second left panels 20, 22 on one side thereof. This map 36 can be a portion of any desired geographic area. In the illustrated embodiment, city X is illustrated. The map has color coded portions corresponding to designated roads as shown in FIG. 3, which illustrates Z highway as green (the color coding scheme) and Broad Street as yellow (the color coding scheme).

A set of flip-up brochures 40 are positioned on each first and second right panel 24, 26 on the same side on the sheet as the map. Each set of flip-up brochures 40 has an upper edge 42 that is secured along an upper edge 28 of the respective first and second right panels 24, 26. The flip-up brochures 40 can be connected together and secured to the sheet 12 by saddle stitching and adhesive or other techniques known to those skilled in the art.

At least one set of flip-up brochures 40 includes printed indicia corresponding to an address of a geographic attraction. This printed indicia is color coded to the color coding of the map 36. For example, the second right panel 24, 26 could include flip-up brochures 40 directed to city X attractions, including special events, historical attractions, night clubs, restaurants, lodging and recreation. As shown in FIG. 3, a number of the flip-up brochures 40 have been lifted to expose the historical sites, including site A, site B and site C. Each of the three sites, A–C, include an address that is color coded to the corresponding color coded street on the map 36 positioned on the first and second left panels 20, 22.

For example, the ABC County Museum could be listed with a street address of 1000 Broad Street, shown in gold or yellow, corresponding to the yellow or gold shading of Broad Street on the map of first and second left panels 20, 22. The set of flip-up brochures 40 can also include staggered pages 44 to enhance lifting of selected pages. Also, each staggered page 44 can include a lower portion 46 that is exposed by the immediately overlapping page. This lower portion 48 is exposed and includes printed indicia 48 that identifies the particular type of attraction within the geographic area defined by the map on the first and second left panels. For example, in the drawing of FIG. 3, the flip-up brochures 40 show Historical, Recreation and Lodging sites. Other areas can include photographs 48*a*.

As illustrated in FIG. 3, the set of flip-up brochures on the first right panel 24 includes a plurality of brochures 50 wherein each brochure includes a map 52 of a defined area of the map on first and second left panels 20, 22.

As shown in FIG. 4, the first and second left panels 20, 22 can have a width that is less than the first and second right panels 24, 26. For example, the first and second left panels 20, 22 can be about four inches in width and the first and second right panels 24, 26 can be about 4.25 inches in width. The second right panel 26 is folded over the first right panel 26, and the first left panel 24 is folded over the second left panel 24. The vertical gutter margin 30 between first and second right panels 24, 26 permits clearance such that the flip-up brochures 40 will not be squeezed excessively and damaged. The other vertical gutter margin 30 defined between the second left panel 22 and first right panel 24 allows clearance to enhance folding. The vertical gutter margins can be about 0.25 inches.

It is evident that the novel layout of the travel brochure is advantageous because it now allows correspondence between geographic attractions contained in flip-up brochures and a map corresponding to a selected geographic area of a particular city or other location. The travel brochure of the present invention also can be folded into a compact unit that is readily accessible by a driver or tourist.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A travel brochure comprising:
   a sheet having top and bottom edges and having only three vertical fold line portions extending from top to bottom edges and defining only respective rectangular configured first and second left panels and only first and second right panels for the sheet, said first and second left panels forming, when unfolded, a map portion, each defining an upper edge;
   a map corresponding to a selected geographic area printed on the first and second left panels on one side thereof, said map having color coded portions corresponding to designated roads and geographic highlights;
   a set of flip-up brochures positioned on the first and second right panels on the same side of said sheet as said map, wherein each set of flip-up brochures has an upper edge that is secured along an upper edge of the respective first and second panels, wherein at least one set of flip-up brochures includes a plurality of lateral flaps with a listing of color-coded roads and geographic highlights, wherein said roads and geographic highlights have a cross-designation to said color-coding designating roads and geographic highlights printed on said map on the map portion formed by first and second left panels when unfolded.

2. A travel brochure according to claim 1, wherein said printed indicia corresponding to an address of a geographic attraction is color coded to a color coded portion defining a street on said map positioned on first and second panels.

3. A travel brochure according to claim 1, wherein a set of said flip-up brochures comprises a plurality of flip-up brochures connected at an upper edge, wherein each brochure comprises a map corresponding to a selected part of said map positioned on said first and second panels.

4. A travel brochure according to claim 1, wherein said vertical fold line portions comprise a first left fold line and respective first and second closely spaced pairs of right fold lines defining vertical gutter margins to enhance folding over the flip-up brochures.

5. A travel brochure according to claim 1, wherein the side of said sheet opposing said map and flip-up brochures includes defined regions for photographs and printed indicia.

6. A travel brochure according to claim 1, wherein said at least one set of said flip-up brochures comprise staggered pages to enhance lifting of selected pages and provide titles to geographic attractions.

7. A travel brochure according to claim 1, wherein each staggered page includes a lower portion that is exposed by the immediately overlapping page, wherein said lower portion that is exposed includes printed indicia that identifies a particular type of attraction within the geographic area defined by the map on the first and second panels.

8. A travel brochure comprising:
   a substantially rectangular configured sheet having top and bottom edges and having a left vertical fold line defining only respective first and second substantially rectangular configured left panels, said first and second left panels forming, when unfolded, a map portion, and first and second closely spaced pairs of right fold lines defining vertical gutter margins to form only first and second substantially rectangular configured right panels, wherein each panel has an upper edge;
   a map corresponding to a selected geographic area printed on the first and second left panels on one side thereof, said map having color coded portions corresponding to designated roads;

a set of flip-up brochures positioned on each first and second right panel on the same side of said sheet as said map, wherein each set of flip-up brochures includes an upper edge that is secured along an upper edge of the respective first and second right panels, wherein at least one set of flip-up brochures includes a plurality of lateral flaps with a listing of color-coded roads and geographic highlights, wherein said roads and geographic highlights have a cross-designation to said color-coding designating roads and geographic highlights on said map of an unfolded portion formed by first and second panels, wherein said closely spaced pairs of right fold lines defining vertical gutter margins enhance folding over the flip-up brochures.

9. A travel brochure according to claim 8, wherein said printed indicia corresponding to an address of a geographic attraction is color coded to a color coded portion defining a street on said map positioned on first and second left panels.

10. A travel brochure according to claim 8, wherein a set of said flip-up brochures comprises a plurality of flip-up brochures connected at an upper edge, wherein each brochure comprises a map corresponding to a selected part of said map positioned on said first and second left panels.

11. A travel brochure according to claim 8, wherein the side of said sheet opposing said map and flip-up brochures includes defined regions for photographs and printed indicia.

12. A travel brochure according to claim 8, wherein said at least one set of said flip-up brochures comprise staggered pages to enhance lifting of selected pages and provide titles to geographic attractions.

13. A travel brochure according to claim 12, wherein each staggered page includes a lower portion that is exposed by the immediately overlapping page, wherein said lower portion that is exposed includes printed indicia that identifies a particular type of attraction within the geographic area defined by the map on the first and second left panels.

14. A travel brochure comprising:
   a substantially rectangular configured sheet having a only left vertical fold line defining respective first and second substantially rectangular configured left panels and first and second pairs of right fold lines defining vertical gutter margins to form only first and second substantially rectangular configured right panels, wherein each panel has an upper edge, said first and second left panels forming, when unfolded, a map portion;

a map corresponding to a selected geographic area printed on the first and second left panels on one side thereof;

a set of flip-up brochures positioned on each first and second right panel on the same side of said sheet as said map, wherein each set of flip-up brochures includes an upper edge that is secured along an upper edge of the respective first and second right panels, wherein at least one set of flip-up brochures includes a plurality of lateral flaps with a listing of color-coded roads and geographic highlights, wherein said roads and geographic highlights have a cross-designation to said color-coding designating roads and geographic highlights on said map of an unfolded portion formed by first and second panels, wherein said closely spaced pairs of right fold lines defining vertical gutter margins enhance folding over the flip-up brochures.

15. A travel brochure according to claim 14, wherein a set of said flip-up brochures comprises a plurality of flip-up brochures connected at an upper edge, wherein each brochure comprises a map corresponding to a selected part of said map positioned on said first and second left panels.

16. A travel brochure according to claim 14, wherein the side of said sheet opposing said map and flip-up brochures includes defined regions for photographs and printed indicia.

17. A travel brochure according to claim 14, wherein said at least one set of said flip-up brochures comprise staggered pages to enhance lifting of selected pages and provide titles to geographic locations.

18. A travel brochure according to claim 14, wherein each staggered page includes a lower portion that is exposed by the immediately overlapping page, wherein said lower portion that is exposed includes printed indicia that identifies a particular type of attraction within the geographic area defined by the map on the first and second left panels.

* * * * *